March 12, 1968 R. H. G. CHAN 3,373,418

BIT BUFFERING SYSTEM

Filed Sept. 14, 1964 2 Sheets-Sheet 1

INVENTOR.
ROBERT H. G. CHAN

BY

Carl V. Olson

Attorney

INVENTOR.
ROBERT H. G. CHAN
BY Carl V. Olson
Attorney

United States Patent Office 3,373,418

Patented Mar. 12, 1968

3,373,418

BIT BUFFERING SYSTEM

Robert H. G. Chan, Barrington, N.J., assignor to Radio Corporation of America, a corporation of Delaware Filed Sept. 14, 1964, Ser. No. 396,207
7 Claims. (Cl. 340—172.5)

ABSTRACT OF THE DISCLOSURE

A bit buffering system for use between many real-time digital communications channels each supplying and receiving bit-serial information at its own independent rate, and a communications processing computer capable of receiving information from and supplying information to the many communications channels in an ordered time sequence. The buffering system employs a bit buffer between each communications channel and a computer means capable of performing character buffering. Each bit buffer includes a two-stage input register for temporarily storing a received information bit and input bit status information. Each bit buffer also contains a three-stage output register for temporarily storing one outgoing information bit and output status information.

*General*

It is a known practice in digital communications systems to connect each incoming channel line to a character buffer in which the information bits arriving serially are accumulated into a character, which is then supplied to communication processing computer equipment. Similarly, each outgoing line is connected to a character buffer which receives a character from the communications processing equipment and supplies information bits, one bit at a time, to the outgoing line. Each of these character buffers normally includes a shift register having twice as many flip-flops as there are bits in a character, and other storage and control circuits.

When there are many communications channels to be serviced by a communications processing computer, the correspondingly large number of character buffers are costly, occupy a large amount of space and consume a large amount of power. The disadvantages of using individual character buffers are particularly significant when the system includes a large number, such as 250, of communications channels.

The functions performed by many individual character buffers may instead be performed by a corresponding number of inexpensive individual bit buffers and a small, fast, inexpensive character buffer computer. Such a character buffer computer has a memory in which each received bit from each communications channel is added to previously received bits from the respective channel. When a complete character has been thus accumulated, it is transferred to the communications processing computer equipment. Information also simultaneously flows in the reverse direction. Characters transferred from the communications processing computer equipment to the character buffer computer are distributed a bit at a time to the appropriate communications channels. Alternatively, instead of employing a separate character buffer computer, a single main computer may perform the functions of the character buffer computer in addition to performing the functions of the communications processing computer equipment.

When a computer is employed for character buffering, the computer must communicate in ordered time sequence with all of the communications channels, and it must communicate with each communications channel at least as frequently as the frequency of occurrence of successive information bits.

Bit-serial information signals arriving at a terminal of a communications channel are degraded as the result of distortion and interference introduced during transmission. For this reason, the received information is most accurately reproduced if the information bits are sampled at the centers of the bit intervals. Once a received bit has been sampled, the bit information derived must be stored long enough so that it is available for transfer to the character buffer computer at the next instant of time allocated in the buffer computer sequence to the particular channel. Also, outgoing information bits supplied by the character buffer computer in its timing sequence must be temporarily stored for acceptance by the communications channel at times determined by the operation of the individual channel.

*Objects*

It is an object of this invention to provide an improved bit buffer for use between one of many communications channels and a computer.

It is another object to provide an improved bit buffer capable of handling two-way communications.

It is a further object to provide an improved bit buffer capable of handling either synchronous-mode or asynchronous-mode communications.

It is yet another object to provide an improved bit buffer characterized in being very reliable in the performance of many functions, and in being simple and economical in construction.

*Brief description*

According to an example of the invention, a bit buffer for use between one of many two-way synchronous or asynchronous communications channels and a communications computer includes a buffer address decoder responsive to a unique address from the computer. Means for storing a data bit from the communications channel includes a switch having a synchronous-mode position and an asynchronous-mode position, and an input register having a data input coupled to the communications channel. An input clock gate means is connectable through the switch to the input register to control the transfer of synchronous-mode data thereto from the communications channel. An asynchronous-mode clock pulse counter has an input coupled to the input clock gate means and has an output connectable through the switch to the input register to control the transfer of asynchronous-mode data thereto from the communications channel. Means for transferring a stored data bit from the input register to the computer includes decoder-enabled gates coupling the output of the input register to the computer, and decoder-enabled gates coupling restore signals from the computer to the input register.

Means for storing a data bit received from the computer includes an output register, decoder-enabled gates coupling the output of the output register to the computer, and decoder-enabled gates coupling data from the computer to the output register. Means for transferring a stored data bit from the output register to the communications channel includes means to apply an output clock pulse from the communications channel to the output register.

Figure 1:
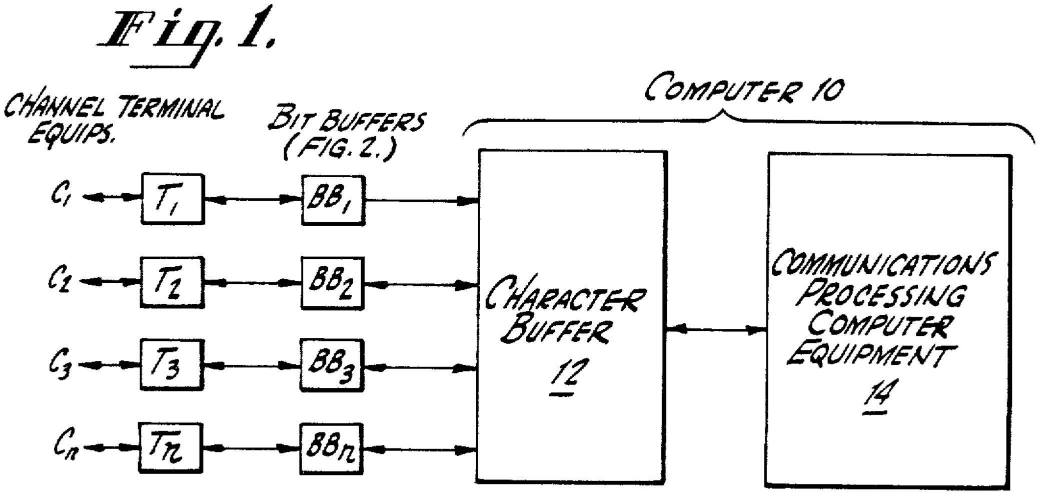
FIG. 1 is a block diagram of a computer-controlled communications system including many bit buffers.

*System of FIG. 1*

Figure 2:
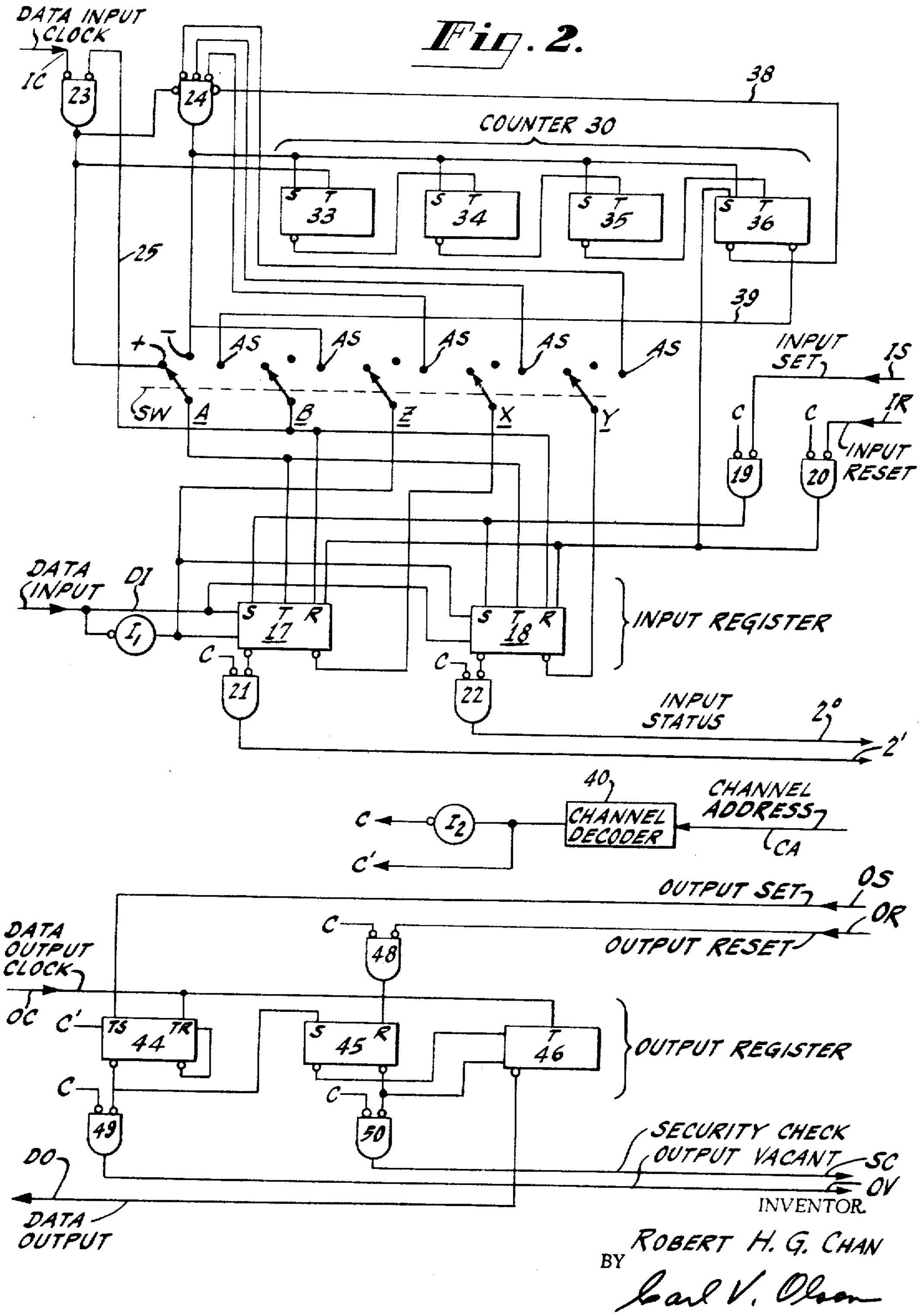
FIG. 2 is a schematic diagram of a bit buffer constructed according to the teachings of the invention for use in a system such as the system of FIG. 1.

Reference is now made to FIG. 1 for a description in greater detail of a system incorporating the invention. FIG. 1 shows a communications system in which many two-way communcations channels $C_1$ through $C_n$ are each connected through respective channel terminal equipments $T_1$ through $T_n$ to corresponding bit buffers $BB_1$ through $BB_n$. Each of the bit buffers includes circuitry as shown in FIG. 2. Each of the bit buffers is connected to a computer 10 which may consist in two parts of a character buffer computer 12 coupled to a communications processing computer equipment 14. Alternatively, the character buffering function performed by the character buffer computer 12 may be performed by a single communications processing computer equipment 10.

In the operation of the system of FIG. 1, each of the communications channels $C_1$ through $C_n$ carries two-way bit-serial information signals between remote terminal equipments and local terminal equipments $T_1$ through $T_n$. Each of the communications channels operates in a real-time manner at an information rate in the range between 75 baud and 2400 baud, which is relatively slow compared with the cycle time of the computer 10. Bit buffers $BB_1$ through $BB_n$ each temporarily store one incoming data bit and one outgoing data bit. The computer 10 communicates with each bit buffer frequently enough so that a data bit is accepted from a bit buffer before the next data bit arrives at the same bit buffer, and supplies an outgoing bit to each bit buffer shortly after the preceding data bit has been transmitted to the communications channel.

*Description of input portion of the bit buffer*

Figure 4:
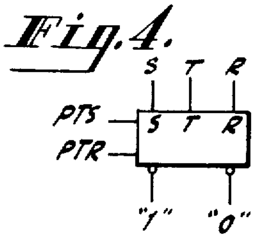
FIGS. 4, 5 and 6 are explanatory diagrams of flip-flops and a "nand" gate used in the system of FIG. 2.

Reference is now made to FIG. 2 for a description of the circuitry in each of the bit buffers $BB_1$ through $BB_n$ shown in FIG. 1. The bit buffer in FIG. 2 includes triggerable flip-flops 17 and 18 which constitute an input data register. Each of the flip-flops 17 and 18 includes as shown in FIG. 4, a set input S, a trigger input T, a reset input R, a prime trigger set input PTS, a prime trigger reset inputs PTR, and the usual "1" and "0" output terminals. The flip-flops respond to positive-going input signals at the trigger input T to produce negative-going output signals, as represented by the bubbles at the "1" and "0" output terminals. A data input line DI is connected to the prime trigger set input of flip-flop 17 and the prime trigger reset input of flip-flop 18. The data input line DI is also connected through in inverter $I_1$ to the prime trigger reset input of flip-flop 17 and the prime trigger set input of flip-flop 18.

Figure 6:
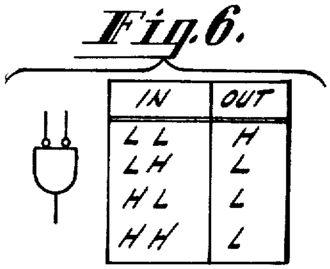

An input set line IS from the computer 10 (FIG. 1) is connected through a gate 19 to set inputs of flip-flops 17 and 18. An input reset line IR from the computer is connected through a gate 20 to reset inputs of flip-flops 17 and 18. The "1" output of flip-flop 17 is connected through a gate 21 to the computer via an input status line $2^1$. The "1" output of flip-flop 18 is connected through a gate 22 to the computer via an input status line $2^0$. The gates 19 and 22, and other gates to be described, are "nand" gates having bubbles at their inputs to indicate that each provides a positive going output only when all of its inputs are negative, in accordance with the truth table of FIG. 6.

The data input register 17, 18 receives input data from the communications channel under the control of a data input clock line IC from the communications channel. The line IC is connected through a gate 23 to the terminal "+" of the portion A of a three-position, five-pole rotary switch SW. Switch SW has a first position "+" for synchronous-mode operation on a positive going transition, a position "−" for synchronous-mode operation on a negative going transition and a position AS for asynchronous-mode operation. When the switch is in the position shown, the connection from gate 23 is completed through switch SW to the trigger inputs T of flip-flops 17 and 18.

Input clock gate 23 has an output also connected as an inhibit input to a second input clock gate 24. The output of gate 24 is connectable through the terminal AS of the portion B of switch SW and over line 25 as an inhibit input to gate 23. When either one of gates 23 and 24 is enabled, its output inhibits the other. The output of gate 24 is also connected to the set inputs of a counter 30 comprised of four triggerable flip-flops 33, 34, 35 and 36. The counter 30 may be omitted from the bit buffer if the bit buffer is to be used with a synchronous communications channel. The counter 30 is needed only for use with an asynchronous channel. The output of gate 23 is coupled to the trigger input T of flip-flop 33. The "1" output of flip-flop 36 is connected over line 38 as an input to gate 24. The "0" output of flip-flop 36 is connected over line 39 and the position AS of the portion A of switch SW to trigger inputs of input flip-flops 17 and 18. The data input line at the output of inverter $I_1$ is connectable through the portion Z of switch SW to an input of gate 24; the "0" output of flip-flop 17 is connectable through the portion X of switch SW to an input of gate 24; and the "0" output of flip-flop 18 is connectable through the portion Y of switch SW to an input of gate 24.

A multi-conductor channel address line CA from the the computer is connected to a channel decoder 40 having an output C′ and an inverted output C. The output C of the decoder 40 is connected as an enabling signal to inputs of gates 19 through 22 in the input portion of the bit buffer. The decoder output C′, and also the decoder output C, are connected to correspondingly designated inputs of elements of the data output portion of the bit buffer now to be described.

*Description of output portion of the bit buffer*

Figure 5:
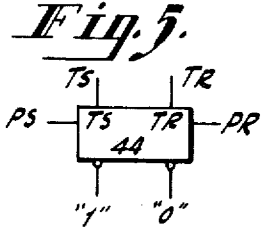

The output portion of the bit buffer includes an output data register constituted by flip-flops 44, 45 and 46. Flip-flop 44, as shown in FIG. 5, has a trigger set input TS by which the flip-flop may be set provided that there is a prime set signal on terminal PS, and it has a trigger reset input TR by which the flip-flop may be reset provided that there is a prime reset signal on terminal PR. The flip-flop 44 also has the usual "1" and "0" outputs. Flip-flop 45 is conventional. Flip-flop 46 is in accordance with FIG. 4.

A data bit from the computer may be stored in the output register by means of signals applied over output set line OS to the trigger-set input of flip-flop 44 and over output reset line OR and gate 48 to the reset input of flip-flop 45. The "1" output of flip-flop 44 is coupled to the set input of flip-flop 45. Flip-flops 44 and 45 store a "mark" ("1") when both flip-flops are in the set condition, and they store a "space" ("0") when flip-flop 44 is set and flip-flop 45 is reset.

The "1" output of flip-flop 44 is connected through a gate 49 to the computer through an output vacant line OV. The "0" output of flip-flop 45 is connected through a gate 50 to the computer through a security check line SC. The "1" and "0" outputs of flip-flops 45 are connected to respective prime trigger set and prime trigger reset inputs of flip-flop 46. The "1" output of flip-flop 46 is connected to the communications channel over a data output line DO. A data output clock signal from the communications channel is applied over a line OC to the trigger reset input TR of flip-flop 44 and to the trigger input T of flip-flop 46.

*Operation of input portion of bit buffer with synchronous channel*

Figure 3:
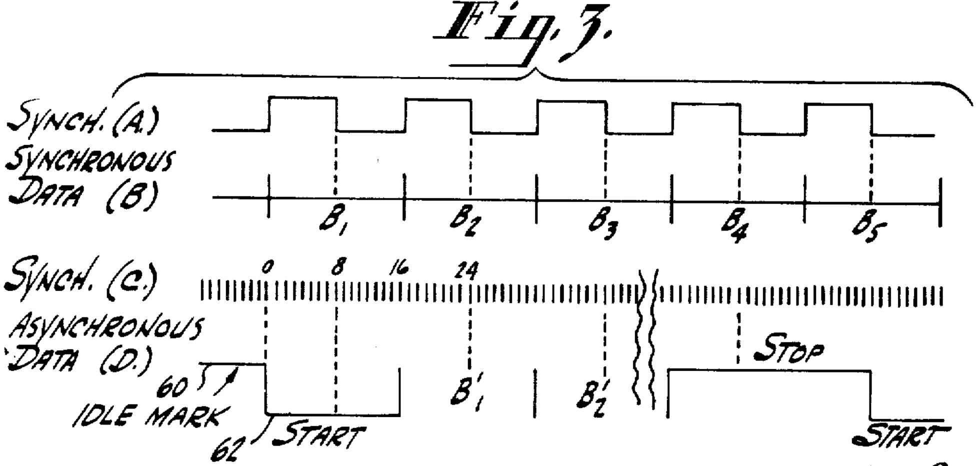
FIG. 3 is a chart of timing relationships which will be referred to in explaning the operation of the bit buffer of FIG. 2.

In the operation of the bit buffer of FIG. 2, the switch SW is placed in the position shown when the bit buffer is used with a synchronous communications channel having a synchronizing clock signal as shown in FIG. 3A. The synchronizing clock signal of FIG. 3A has negative-going transitions at the centers of the data bits $B_1$ through $B_5$ shown in FIG. 3B. Each data bit is either a positive pulse or a negative pulse.

The operation of the data input portion of the bit buffer of FIG. 2 will now be described starting at a condition in which input flip-flops 17 and 18 have both been set by an input set signal from the computer over line IS and through gate 19. When an input data bit $B_1$ appears on the data input line DI from the communications channel, it is applied to the prime inputs of flip-flops 17 and 18. The data signal applied to the prime inputs causes no change in the states of flip-flops 17 and 18 until a negative-going transition occurs in the data input clock synchronizing signal from the communications channel on line IC.

The negative-going transition of the clock signal passes through gate 23 and the A portion of switch SW to the trigger inputs T of flip-flops 17 and 18. The triggered flip-flops 17 and 18 assume different states determined by whether the data input is a "1" (mark) or a "0" (space). If the data input bit is a "1," flip-flop 17 remains in the set state and flip-flop 18 is triggered to the reset state. If the data input bit is a "0," the flip-flop 17 is triggered to the reset state and the flip-flop 18 remains in the set state. The data input bit has now been sampled at the center of the bit period. and the "1" and "0" information of the data bit is stored in the states of flip-flops 17 and 18.

At a following instant of time determined by the operation of the computer, and before the time for sampling the next received data bit from the communications channel, the computer addresses the bit buffer of FIG. 2 by applying a channel address signal over multi-conductor line CA to the channel decoder 40. The same channel address signal is applied to the decoder 40 of all bit buffers in the system. The channel decoder 40 in FIG. 2 responds to the unique channel address signal associated with the bit buffer and the corresponding channel and provides outputs C and C′. The output C enables gates 21 and 22 and causes the status of the input flip-flops 17 and 18 to be supplied to the computer over input status lines to $2^0$ and $2^1$. This accomplishes the transfer of the data bit from the flip-flops 17 and 18 to the computer.

After accepting the data bit the computer supplies an input set signal over line IS and through decoder-enabled gate 19 to set the flip-flops 17 and 18. The input portion of the bit buffer is then in condition to repeat the described operation in causing the transfer of the next data bit from the communications channel to the flip-flops 17 and 18, and thereafter the transfer of the data bit to the computer.

If there is no data bit stored in flip-flops 17 and 18 when the computer addresses the bit buffer over the channel address line CA, the flip-flops 17 and 18 are both set and the input status signals supplied to the computer over lines $2^0$ and $2^1$ are both "1's." These input status signals are recognized by the computer as indicating the absence of an input data bit in the bit buffer.

The "—" position of the portion A of switch SW is used with a synchronous communications channel if the phase of the data input clock synchronizing signal supplied by the channel is opposite that shown in FIG. 3A. That is, if the synchronizing signal at input line IC has a positive-going transition at the middle of each data bit, a double inversion of the clock synchronizing signal is accomplished by gates 23 and 24. The positive-going transition disables gate 23 causing its output to go low and to enable gate 24. Gate 24 then provides a positive-going output transition through switch SW to the trigger inputs T of flip-flops 17 and 18. Flip-flops 17 and 18 respond at their trigger inputs T solely to positive-going transitions.

*Operation of output portion of bit buffer*

At the same time that the bit buffer is operative as described to transfer a bit from the communications channel to the computer, the buffer is also simultaneously operative to transfer a data bit from the computer to the communications channel. The operation of the output portion will be described starting from a condition in which flip-flop 44 is reset and flip-flop 45 is set. This condition of flip-flops 44 and 45 indicates that the output portion of the bit buffer is empty of a stored data bit.

When the buffer is addressed by the computer over channel address line CA, the decoder output C enables gates 49 and 50 in the data output portion of the bit buffer. The computer recognizes the signals on lines SC and OV as indicating the availability of the buffer for the receipt of a data bit, and the computer then supplies signals on output set line OS and output reset line OR in accordance with whether a "1" (mark) or a "0" (space) is to be transferred to the output portion of the buffer. If the bit to be transferred is a "1," a signal is applied over output set line OS to set flip-flop 44, and no signal is applied over output reset line OR and through gate 48 to flip-flop 45, with the result that flip-flop 45 remains set. If the data bit to be transferred is a "0," a signal is sent over output set line OS to set flip-flop 44, and a signal is applied over output reset line OR and through gate 48 to reset flip-flop 45.

At a subsequent instant of time determined by the timing requirements of the communications channel, the communications channel supplies a data output clock synchronizing signal over line OC to the output portion of the bit buffer. The output clock synchronizing signal may be like the synchronizing signal illustrated in FIG. 3A. The clock synchronizing signal is applied to the trigger reset input TR of flip-flop 44 and to the trigger input T of flip-flop 46. The triggering of flip-flop 46 causes the switching of flip-flop 46 in accordance with the prime inputs supplied thereto from the outputs of flip-flop 45. The stored data bit is thus supplied from the flip-flop 46 over data output line DO to the communications channel. The output clock synchronizing signal also resets flip-flop 44 which then provides an output that sets flip-flop 45. Flip-flops 44 and 45 are now again in the condition from which the described cycle of operation can be repeated in handling the next successive data bit.

The operation of the output portion of the bit buffer has been described for the normal condition in which the flip-flops 44 and 45 were empty of data when addressed by the computer. This and other conditions of flip-flops 44 and 45 are as follows:

| Condition | FF44 | FF45 | Meaning |
|---|---|---|---|
| 1 | Reset | Set | Empty. |
| 2 | Set | Reset | Space ("0") stored. |
| 3 | Set | Set | Mark ("1") stored. |

If the computer finds one of above conditions 2 or 3, it knows there is a data bit stored in the bit buffer and the computer checks the data bit against the bit it last supplied to the buffer to determine if the bit in the buffer is valid. If the bit stored in the buffer is invalid, the computer supplies an output reset signal over line OR and through gate 48 to reset flip-flop 45. Therefore, under all invalid conditions, only spaces are permited to be stored in register 44, 45. This prevents the transmission of invalid data bits.

*Operation of input portion of the bit buffer with asynchronous channel*

The operation of the bit buffer of FIG. 2 when it is connected to an asynchronous communications channel will now be described. An asynchronous communications channel is one in which the data bits of a character are preceded by a "start" signal and are followed by a "stop" signal. The sampling of data bits of a character must be timed in relation to the "start" signal of the particular character. The asynchronous data signal of a character may be as represented in FIG. 3D. An input clock synchronizing signal may be as represented in FIG. 3C and may have a freqeuncy sixteen times the bit frequency of the data signal. Each of the marks in FIG. 3C represents one square-wave cycle of the synchronizing signal.

When the bit buffer of FIG. 2 is connected to an asynchronous communications channel, the switch SW is placed in its right-most position making contact with all of the terminals AS. The operation of the bit buffer will be given starting from an initial condition in which all of the inputs to gate 24 are low causing the gate 24 to be enabled and to provide a high or positive output. The high output of gate 24 is applied to counter 30 to set all of the flip-flops therein making the count 1111. The high output of gate 24 also is applied through the portion B of switch SW and over line 25 to an input of gate 23 to inhibit gate 23. Therefore, the continuously supplied high-frequency clock synchronizing signal of FIG. 3C applied from the communications channel on line IC is blocked at gate 23. No data is being supplied by the communications channel so that the data input on line DI is high representing an "idle mark" signal 60 (FIG. 3D). Data input flip-flops 17 and 18 are both reset, a condition existing only when the bit buffer is connected to an asynchronous communications channel.

When a "start" signal 62 (FIG. 3D) appears on the data input line DI from the communications channel, the output of inverter $I_1$ goes high and supplies a corresponding signal through the portion Z of switch SW to an input of gate 24, causing the gate 24 to be disabled and to provide a low output. The low output of gate 24 is applied through the portion B of switch SW and over line 25 to an input of gate 23. Gate 23 is enabled so that the clock synchronizing signals start to pass through gate 23 to the trigger input T of flip-flop 33 of counter 30. Counter 30 then proceeds to count the clock synchronizing pulses starting from the time of the input start signal.

The first clock synchronizing pulse applied to counter 30 changes the count from 1111 to 0000 so that all flip-flops are then reset. When flip-flop 36 is thus reset, the "1" output (which is high) of flip-flop 36 is applied over line 38 to an input of gate 24 to insure that gate 24 will remain disabled and gate 23 will remain enabled to pass clock synchronizing pulses. In the absence of the connection over line 38, noise or other fluctuations superimposed on the start signal on data input line DI might act through the portion Z of switch SW to enable gate 24 and thereby disable gate 23.

The eighth clock synchronizing pulse following the first pulse causes flip-flop 36 to be triggered to the set condition. When flip-flop 36 is set, its "0" output goes high and is applied over line 39 and the portion A of switch SW to the trigger inputs T of data input flip-flops 17 and 18. This causes the flip-flops 17 and 18 to accept and store the "start" signal from the data input line DI. Clock synchronizing pulses continue to be supplied to the input of counter 30. The sixteenth pulse following the first pulse causes flip-flop 36 to be reset so that its "0" output goes low. This negative-going transition does not trigger data input flip-flops 17 and 18 because the trigger inputs of these flip-flops respond only to positive-going transitions.

At some time between the eighth and the twenty-fourth clock synchronizing pulses (FIG. 3C), the computer sends a channel address signal over line CA to the decoder 40 to produce signal C which enables gates 21 and 22. The "start" signal stored in flip-flops 17 and 18 is then transferred to the computer over lines $2^0$ and $2^1$. Thereafter, the computer sends an input set signal over line IS and through enabled gate 19 to set data input flip-flops 17 and 18. The "0" outputs of flip-flops 17 and 18 are then high and they act through portions X and Y of switch SW to maintain gate 24 disabled. Gate 23 thus remains enabled and continues to pass synchronizing pulses to the counter 30.

When the twenty-fourth clock synchronizing pulse following the first pulse triggers the counter 30, flip-flop 36 is triggered to its set state. The positive-going transition produced on its "0" output is applied over line 39 and portion A of switch SW to the trigger inputs of input flip-flops 17 and 18. The input flip-flops 17 and 18 then accept and store the first information bit $B_1'$ present on the data input line DI.

The operation then proceeds in the same manner until all the bits of the character and the "stop" signal have been transferred from the communications channel to the computer. The computer recognizes the stop signal because it follows a known fixed number of data bits, and the computer then sends an input reset signal (rather than an input set signal) over line IR and through gate 20 to the reset inputs of flip-flops 17 and 18. The "0" outputs of flip-flops 17 and 18 are then low and they are applied through portion X and Y of switch SW to gate 24. Gate 24 is then enabled when a negative half cycle of the clock synchronizing signal is applied to it from gate 23, because all the other inputs to gate 24 are also low. The "stop" signal from input line DA, inverter $I_1$ and portion Z of switch SW is low when applied to gate 24. And, counter flip-flop 36 was triggered to the set condition at the time for sampling the "stop" signal, so its "1" output applied to gate 24 is low. The input portion of the bit buffer of FIG. 2 is now in condition to receive the "start" bit of the next following asynchronous character. The operation as described then repeats.

*Operation of the output portion of the bit buffer with asynchronous channel*

The operation of the data output portion of the bit buffer of FIG. 2 when connected to an asynchronous communications channel is the same as has been described for the condition when it is connected to a synchronous communications channel.

What is claimed is:

1. A bit buffer for use between one of many communications channels and a communications computer, comprising a buffer address decoder responsive to a unique address from said computer and operative to generate an enable signal, first and second triggerable input flip-flops having prime inputs and having states indicative of the storage of a "1," the storage of a "0," and the absence of stored data, means coupling data from the communications channel in different senses to prime inputs of said input flip-flops, means coupling clock pulses from said communications channel through said input clock gate to trigger inputs of said flip-flops, whereby to store a "1" or a "0" data bit in said flip-flops, first decoder-enabled gates coupling the outputs of said input flip-flops to the computer, and second decoder-enabled gates coupling set and reset signals from the computer to said input flip-flops.

2. A bit buffer for use between a communications computer and one of many communications channels, comprising a buffer address decoder responsive to a unique address from said computer and operative to generate an enable signal, first, second and third output flip-flops having an output of the first coupled to an input of the second, having an output of the second coupled to an input of the third, and having an output of the third coupled to the outgoing line of the communications channel, first decoder-enabled gates for coupling the states of said first and second output flip-flops to said computer, second decoder-enabled gates for applying signals from said computer to said first and second output flip-flops to establish states therein indicative of the storage of a "1" or a "0" data bit, and means to apply an output clock pulse from said communications channel to trigger said third flip-flop to provide a data output to the communications channel from the third flip-flop in accordance with the contents of the second flip-flop, and to reset said first flip-flop to thereby cause setting of said second flip-flop.

3. A bit buffer for use between one of many synchronous or asynchronous two-way communications channels and a communications computer, comprising a buffer address decoder responsive to a unique address from said computer, a switch having a synchronous-mode position and an asynchronous-mode position, an input register having a data input coupled to the communications channel, input clock gate means connectable through said switch to said input register to control the transfer of synchronous-mode data thereto, an asynchronous mode clock pulse counter having an input coupled to said input clock gate means and having an output connectable through said switch to said input register to control the transfer of asynchronous-mode data thereto, whereby to store a "1" or a "0" data bit in said input register, first decoder-enabled gates coupling the output of said input register to the computer, and second decoder-enabled gates coupling restore signals from the computer to the input register, whereby to transfer the data bit from the input register to the computer.

4. A bit buffer for use between one of many synchronous or asynchronous two-way communications channels and a communications computer, comprising a buffer address decoder responsive to a unique address from said computer, a switch having a synchronous-mode position and an asynchronous-mode position, an input register having a data input coupled to the communications channel, input clock gate means connectable through said switch to said input register to control the transfer of synchronous-mode data thereto, an asynchronous mode clock pulse counter having an input coupled to said input clock gate means and having an output connectable through said switch to said input register to control the transfer of asynchronous-mode data thereto, whereby to store a "1" or a "0" data bit in said input register, first decoder-enabled gates coupling the output of said input register to the computer, second decoder-enabled gates coupling restore signals from the computer to the input register, whereby to transfer the data bit from the input register to the computer, an output register, third decoder-enabled gates coupling the output of said output register to the computer, fourth decoder-enabled gates coupling data from the computer to the output register, whereby to store a "1" or "0" data bit in said output register, and means to apply an output clock pulse from the communications channel to the output register to control the transfer of stored data to the communications channel.

5. A bit buffer for use between one of many synchronous or asynchronous communications channels and a communications computer, comprising a buffer address decoder responsive to a unique address from said computer and operative to generate an enable signal, first and second triggerable input flip-flops having prime inputs and having four states indicative of the storage of a "1," the storage of a "0," the absence of data or a condition existing during the asynchronous mode of operation, a switch having two positions one of which is used if the channel is synchronous and the other of which is used if the channel is asynchronous, first and second input clock gates each having an output coupled in inhibiting fashion to an input of the other, means coupling data from the communications channel in different senses to prime inputs of said input flip-flops, means coupling clock pulses from said communications channel if synchronous through said first input clock gate and said switch to trigger inputs of said flip-flops, an asynchronous mode clock pulse counter, means coupling clock pulses from said communications channel if asynchronous through said first input clock gate to the trigger input of said counter, and from the outputs of said counter through said switch to the trigger inputs of said flip-flops, whereby to store a "1" or "0" data bit in said input flip-flops, first decoder-enabled gates coupling the outputs of said input flip-flops to the computer, and second decoder-enabled gates coupling set and reset signals from the computer to said input flip-flops.

6. A bit buffer for use between a communications computer and one of many communications channels, comprising a buffer address decoder responsive to a unique address from said computer and operative to generate an enable signal, first, second and third output flip-flops having an output of the first coupled to an input of the second, having an output of the second coupled to an input of the third, and having an output of the third coupled to the outgoing line of a communications channel, first decoder-enabled gates for coupling the states of said first and second output flip-flops to said computer, second decoder-enabled gates for applying signals from said computer to said first and second output flip-flops to establish states therein indicative of the storage of a "1" or a "0" data bit, and means to apply an output clock pulse from said communications channel to trigger said third flip-flop to provide a data output to the communications channel from the third flip-flop in accordance with the contents of the second flip-flop, and to reset said first flip-flop to thereby cause setting of said second flip-flop.

7. A bit buffer for use between one of many synchronous or asynchronous two-way communications channels and a communications computer, comprising a buffer address decoder responsive to a unique address from said computer and operative to generate an enable signal, a bit input portion including first and second triggerable input flip-flops having four states indicative of the storage of a "1," the storage of a "0," the absence of data or a condition existing during the asynchronous mode of operation, a switch having two positions one of which is used if the channel is synchronous and the other of which is used if the channel is asynchronous,
first and second input clock gates each having an output coupled in inhibiting fashion to an input of the other,
means coupling data from the communications channel in different senses to prime inputs of said input flip-flops,
means coupling clock pulses from said communications channel if synchronous through said first input clock gate and said switch to trigger inputs of said flip-flops,
an asynchronous mode clock pulse counter,
means coupling clock pulses from said communications channel if asynchronous through said first input clock gate to the trigger input of said counter, and from the outputs of said counter through said switch to the trigger inputs of said flip-flops,
whereby to store a "1" or a "0" data bit in said input flip-flops,
first decoder-enabled gates coupling the outputs of said input flip-flops to the computer,
second decoder-enabled gates coupling set and reset signals from the computer to said input flip-flops,
a bit output portion including
first, second and third output flip-flops having an output of the first coupled to an input of the second, having an output of the second coupled to an input of the third, and having an output of the third coupled to the outgoing line of a communications channel,
third decoder-enabled gates for coupling the states of said first and second output flip-flops to said computer,
fourth decoder-enabled gates for applying signals from said computer to said first and second output flip-flops to establish states therein indicative of the storage of a "1" or a "0" data bit, and
means to apply an output clock pulse from said communications channel to trigger said third flip-flop to provide a data output to the communications channel from the third flip-flop in accordance with the contents of the second flip-flop, and to reset said first flip-flop to thereby cause setting of said second flip-flop.

References Cited

UNITED STATES PATENTS

| | | | |
|---|---|---|---|
| 3,095,553 | 6/1963 | Hill et al. | 340—172.5 |
| 3,139,607 | 6/1964 | Grondin | 340—172.5 |
| 3,215,987 | 11/1965 | Terzian | 340—172.5 |

ROBERT C. BAILEY, *Primary Examiner.*

R. M. RICKERT, *Assistant Examiner.*